Nov. 19, 1957 R. C. CURTIS 2,814,035
DISPLAY APPARATUS
Filed July 29, 1953 3 Sheets-Sheet 2

OPERATING CONDITION OF UNIT 40 AT TIME $t_0$-$t_1$ & $t_3$-$t_4$

OPERATING CONDITION OF UNIT 40 AT TIME $t_1$-$t_2$

OPERATING CONDITION OF UNIT 40 AT TIME $t_2$-$t_3$

Nov. 19, 1957    R. C. CURTIS    2,814,035
DISPLAY APPARATUS
Filed July 29, 1953    3 Sheets-Sheet 3

United States Patent Office 2,814,035
Patented Nov. 19, 1957

2,814,035

DISPLAY APPARATUS

Richard C. Curtis, Old Westbury, N. Y., assignor to Hazeltine Research, Inc., Chicago, Ill., a corporation of Illinois Application July 29, 1953, Serial No. 370,917

12 Claims. (Cl. 343—7.7)

General

The present invention is directed to display apparatus, and, more particularly, to apparatus for displaying an image of a moving body in changing colors while presenting a display of a stationary object in at least one color. The display apparatus of the present invention is particularly suited for use in radio position locators and hence will be described in that connection.

A radio position locator usually includes a directional transmitting system for scanning a region or space with a directional beam of periodic time-reference wave-signal pulses. It also includes a receiving system for receiving wave-signal pulses such as reflected pulses from an object or target in that region in response to the time-reference pulses and for deriving position-representative pulses from the reflected pulses. The position-representative pulses are applied to a cathode-ray display apparatus which is scanned in synchronism with the space-scanning operation of the transmitting system. The cathode-ray display apparatus ordinarily provides a simultaneous indication of the direction and distance of that object from the radio position locator by a process which entails deflecting the cathode-ray beam radially at the same time that the beam-deflecting system is rotated or operated in synchronism with the rotation of the space-scanning system.

The cathode-ray display apparatus usually displays monochrome images of both the fixed objects and the moving objects. When the display consists of images of many scanned objects, some of which may be moving and others of which may be fixed or relatively slow moving, the busy operator of the radio position locator must pay very close attention to the display in order to distinguish between various of the relatively slow-moving objects and the faster moving objects which may be of interest to him. In order to distinguish at a glance between those objects which are relatively slow-moving and those which are moving at a considerably faster rate, it is considered desirable to display the images of those two types of objects in contrasting colors.

Radio position locators employing display apparatus which include specially constructed multicolor cathode-ray tubes for displaying the images of fast-moving as well as slow-moving objects in contrasting colors have been proposed. These tubes have included fluorescent screens composed of discrete layers of different fluorescent materials capable of emitting light of different colors when properly excited by a cathode-ray beam. Some of these layers, in order to attain substantial fluorescence, require repeated excitation for several consecutive scans with a cathode-ray beam of high intensity, while other layers require a lesser number of excitations with incident energy within a lower amplitude range. The control system for regulating the intensity of the cathode-ray beam in the manner just mentioned is ordinarily an electromechanical device and, hence, is subject to contact and brush troubles inherent in such devices. Furthermore, in some installations it is desirable more quickly to obtain a multicolor display of the images of objects which are space scanned by the directional scanning system of a radio position locator than is produced by the display apparatus of prior such systems.

It is an object of the present invention, therefore, to provide a new and improved display apparatus which substantially avoids the aforementioned limitation of prior such apparatus.

It is another object of the invention to provide for use in a radio position locator a new and improved display apparatus that is capable of providing an indication which permits a viewer quickly to distinguish between stationary and moving objects or between relatively slow-moving and relatively fast-moving objects in the space scanned by the locator.

It is a further object of the invention to provide a new and improved display apparatus capable of presenting readily distinguishable images of two signals, one of which recurs at a substantially constant repetition frequency in a given time interval while the other does not occur at the same repetition frequency throughout the same time interval.

In accordance with a particular form of the invention, a display apparatus, for use in a radio position locator including scanning means having a generator of timing pulses for scanning a region with a directional beam of periodic time-reference wave-signal pulses and including means for receiving wave-signal pulses from an object in that region in response to the time-reference pulses therefrom, comprises a multicolor cathode-ray tube including a screen having a plurality of interspersed elemental area patterns for producing different colors, a source of electrons for exciting the same, and means for deflecting the electrons from that source over the screen in synchronism with the aforesaid directional beam. The apparatus also includes a control system responsive to the position-representative pulses and predetermined ones of the timing pulses for selectively controlling the electrons from the source, whereby the electrons are effective to scan the patterns in a sequence to produce on the screen in changing colors images representative of a moving body in the aforesaid region and in at least one of the aforesaid colors an image representative of a stationary object in the region.

For a better understanding of the present invention, together with other and further objects thereof, reference is had to the following description taken in connection with the accompanying drawings, and its scope will be pointed out in the appended claims.

Referring to the drawings.

Figure 1:
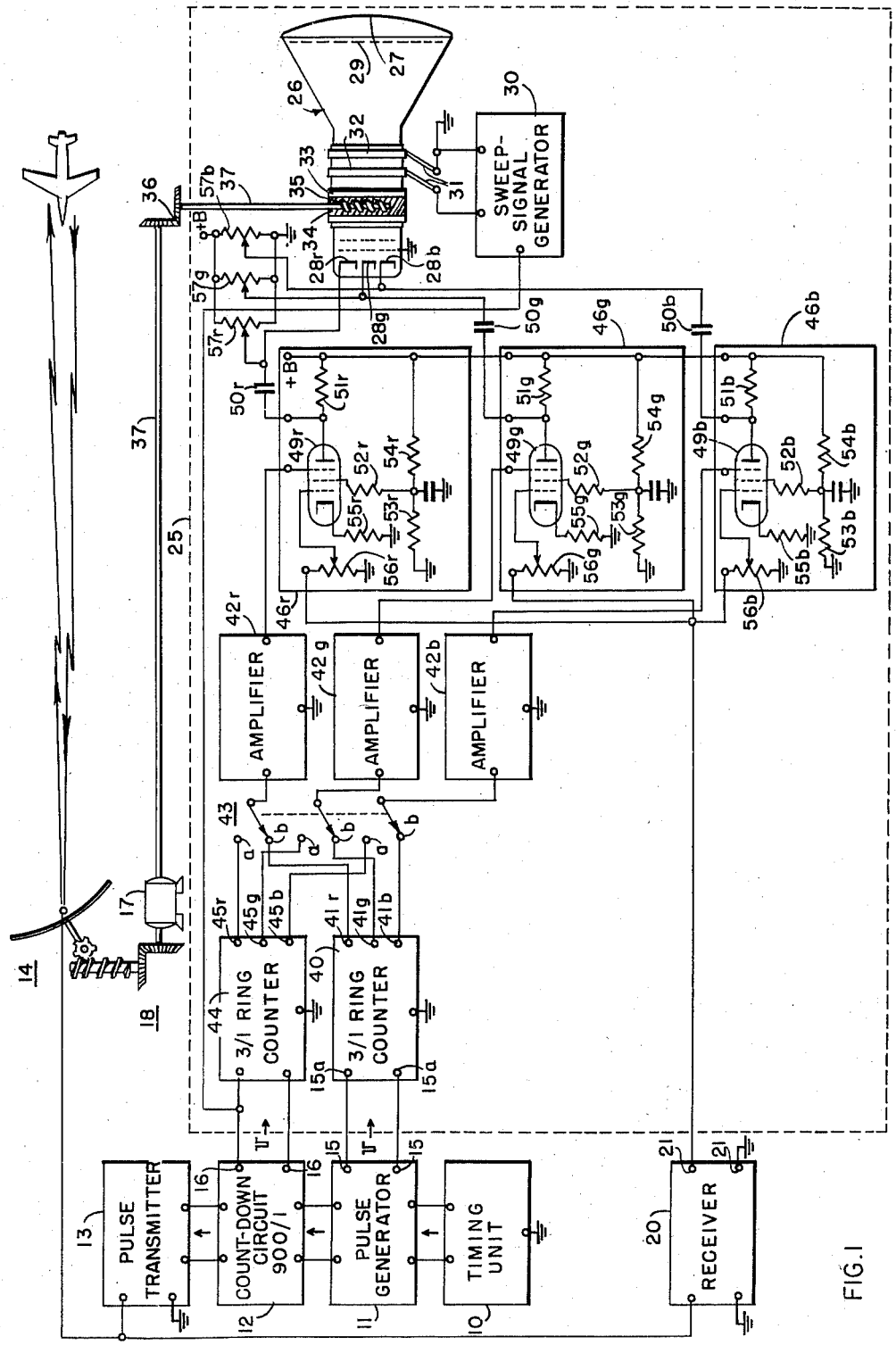
Fig. 1 is a circuit diagram, partly schematic, of a radio position locator including a display apparatus in accordance with the present invention.
Figure 1A:
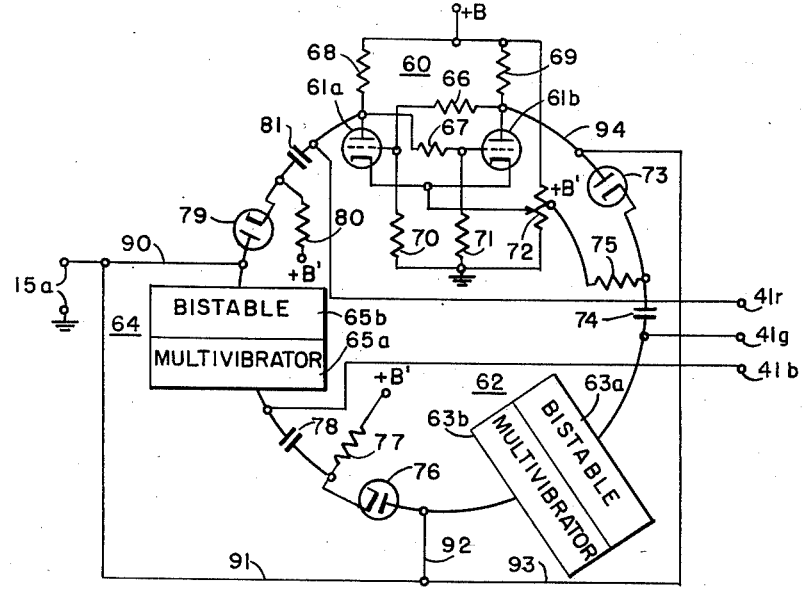
Fig. 1a is a schematic circuit diagram of a device representing a portion of the display apparatus of Fig. 1.
Figure 2A:
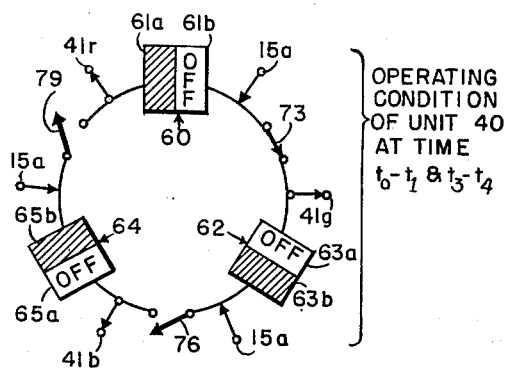
Figure 2B:
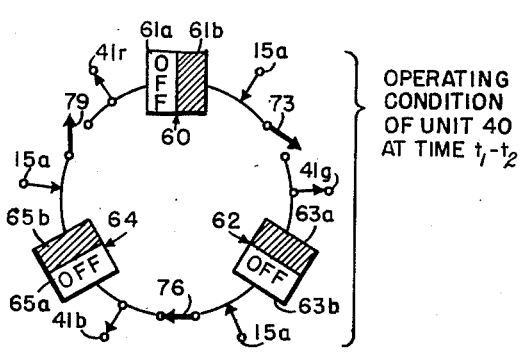
Figure 2C:
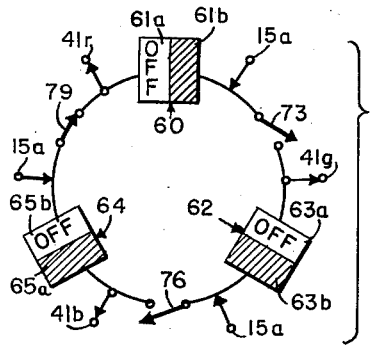
Figure 3:
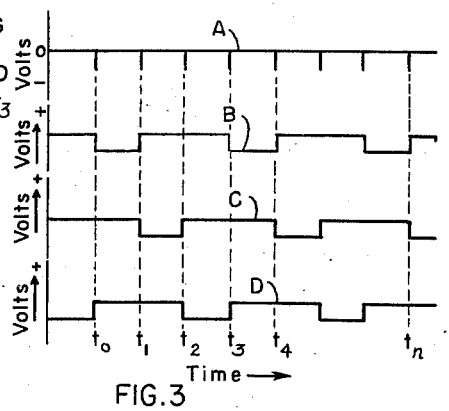
Figure 4:
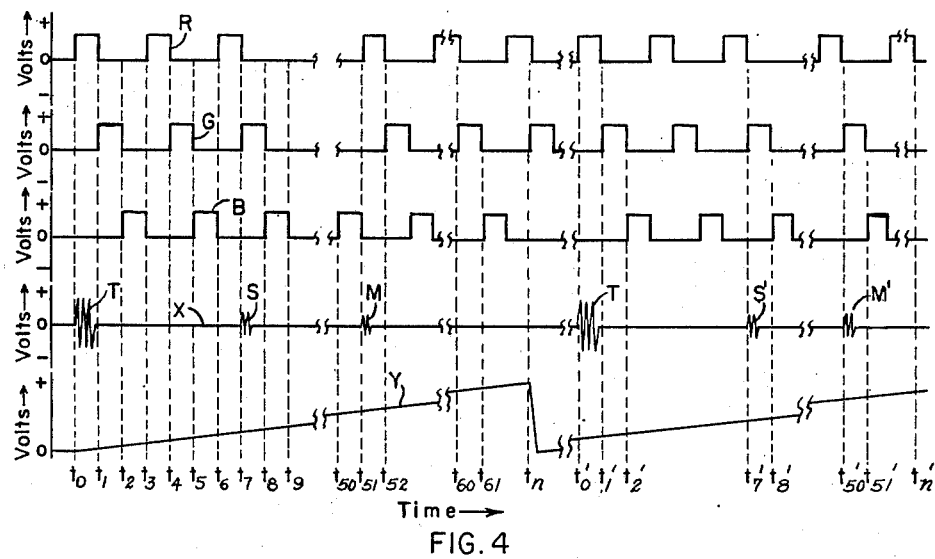
Figure 5A:
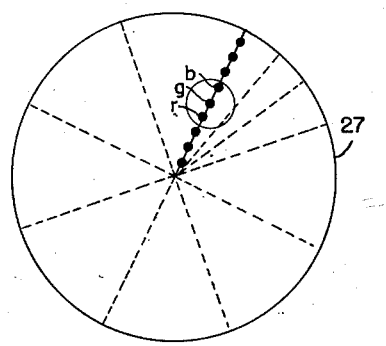
Figure 5B:
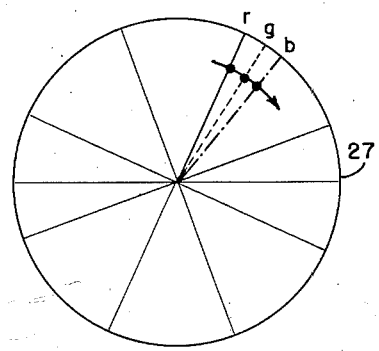
Figure 6:
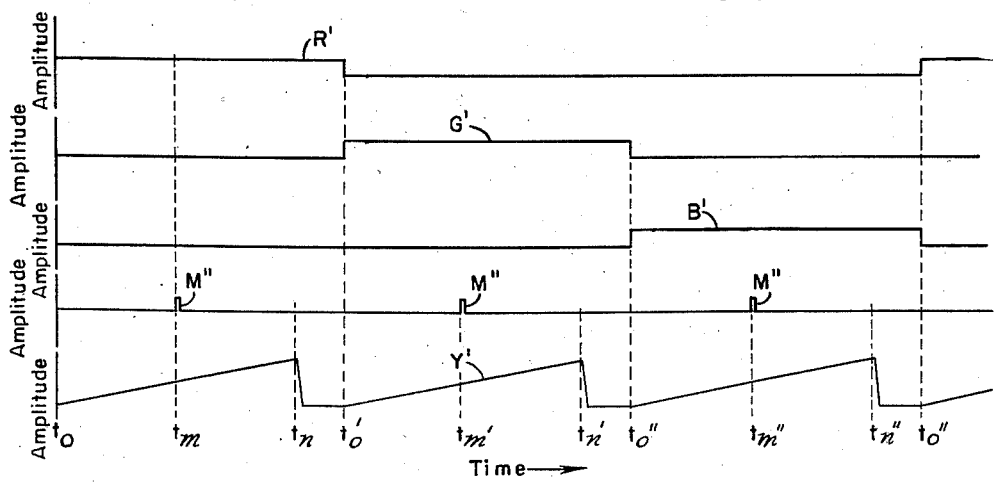

Figs. 2a–2c, inclusive, are a series of simplified schematic diagrams representing the Fig. 1a device in various operating conditions:

Fig. 3 is a graph utilized in explaining the operation of the device of Fig. 1a;

Fig. 4 is a graph utilized in explaining the operation of the radio position locator of Fig. 1;

Figs. 5a and 5b represent diagrammatic portions of a display presented by the display apparatus of Fig. 1, and Fig. 6 is a graph utilized in explaining the operation of the display apparatus of Fig. 1.

Description of radio position locator of Fig. 1 and gating device of Fig. 1a Referring now more particularly to Fig. 1 of the drawings, the radio position locator includes a space-scanning means comprising a timing unit 10, which may comprise a sine-wave oscillator having a suitable operating frequency, such as 1 megacycle, coupled in cascade with a pulse generator 11, a frequency divider or count-down device 12, a pulse transmitter 13 for developing periodic time-reference wave-signal pulses, and a directive rotatable antenna system 14 of conventional construction for scanning a region with a directional beam of wave-signal pulses developed by the unit 13. The pulse generator 11 may be of conventional construction and may include amplifiers and limiters responsive to the sine-wave output signal of unit 10 for developing therefrom periodic rectangular output pulses having a very short duration and a 1-microsecond spacing. The generator 11 includes output terminals 15, 15 at which pulses of negative polarity are developed. The count-down circuit 12 may have a suitable dividing ratio, such as 900:1, and may include suitable amplifiers and wave-shaping networks capable of deriving 1-microsecond pulses of positive polarity having a spacing of the order of 900-microseconds at the terminals coupled to the transmitter 13 and negative polarity pulses of the order of 900 microseconds in duration and a 2700 microseconds spacing between leading edges thereof at its output terminals 16, 16. The directional antenna 14 is rotated at a suitable speed, such as 20 revolutions per minute, by an electric motor 17 coupled to the system through a suitable gear system 18 in order to effect angular scanning. A receiver 20 has its input circuit coupled to the antenna system 14 for receiving wave-signal pulses from an object in the scanned region in response to the transmitted time-reference pulses, and is effective to derive therefrom for application to its output terminals 21, 21 position-representative pulses for application to circuits to be considered more fully hereinafter.

The radio position locator also includes a display apparatus 25 in accordance with the present invention. This apparatus comprises a multicolor cathode-ray tube 26 including a fluorescent screen 27 having a plurality of interspersed elemental area patterns individually effective to produce individual ones of several different colors. The tube 26 may comprise a suitable cathode-ray tube such as one of the tricolor tubes described in an article entitled "General description of receivers for the dot-sequential color television system which employ direct-view tri-color kinescopes" in the RCA Review, volume XI, June 1950, No. 2, at pages 228–232, inclusive. The cathode-ray tube represented in Fig. 1 of the drawings is of the type represented on page 230 of the foregoing article and includes a cathode-ray source for exciting the screen 27, the source being in the form of three electron guns, for simplicity represented schematically by the cathodes 28r, 28g, and 28b, and being effective to excite predetermined elemental area patterns to develop red, green, and blue light. The tube 26 includes a mask 29 containing a multiplicity of groups of apertures each precisely aligned with reference to predetermined ones of the fluorescent elemental areas or dots which form the fluorescent screen 27. Each of the interspersed fluorescent elemental area patterns of the screen contains three substantially circular phosphor dots disposed in a triangular arrangement. The angle of approach of each of the three cathode-ray beams and the gating signals applied to suitable circuits associated with the cathode of the cathode-ray tube 26 and to be described in detail subsequently, determine which of the three fluorescent elemental areas of each pattern is selectively excited during a scanning operation. The cathode-ray tube 26 also includes a deflecting means in the form of a deflecting yoke 33 of the magnetic type which is coupled to a sweep-signal generator 30 through a pair of brushes 31, 31 and slip rings 32, 32 for deflecting the cathode-ray beams radially over the screen 27 a distance representative of the maximum predetermined distance between the scanning antenna 14 and an object in the space scanned thereby. The tube 26 further includes means for angularly displacing the radial deflections in synchronism with the angular displacement or rotation of the directional beam of the antenna system 14. This means comprises a mechanism for rotating the yoke 33 and includes suitable gears 34, 35, 36 and connecting shafts 37, 37 which are mechanically coupled to the driving motor 17 for the antenna system. Resistors 57r, 57g, and 57b are connected across a source of potential +B and adjustable taps on the resistors are individually connected to individual ones of the cathodes 28r, 28g, and 28b of the cathode-ray tube for controlling the brightness of the beams thereof. The brilliancy-control electrode of the tube 26 is grounded.

The display apparatus 25 further includes a control system responsive to the position-representative pulses developed by the receiver 20 and predetermined ones of the timing pulses developed by the generator 11 for selectively controlling the intensities of the electrons or the cathode rays from the source or cathodes 28r, 28g, and 28b, whereby the cathode rays are effective to scan the patterns on the screen 27 in a sequence to produce thereon in changing colors images representative of a moving body in the region scanned by the antenna system 14 and in at least one of the colors an image representative of a stationary object in that region. The control system includes a gating device or ring counter 40 having input terminals 15a, 15a coupled to the output terminals 15, 15 of the pulse generator 11 and having n or three output circuits, that is, one for each of the three cathodes of the cathode-ray tube 26, for developing in each output circuit control pulses each having a duration substantially equal to that of the 1-microsecond periodic time-reference wave-signal pulses developed by the transmitter 13. This ring counter, which will be more fully described hereinafter in connection with Fig. 1a, has three output circuits including individual output terminals 41r, 41g, and 41b individually coupled in the order named to polarity-reversing amplifiers 42r, 42g, and 42b through contacts b, b, b, of a triple-pole double-throw switch 43. The control system 25 preferably includes a second ring counter 44 of the same construction as the counter 40 and having its single input circuit coupled to the output terminals 16, 16 of the count-down circuit 12 and having its three output circuits including individual output terminals 45r, 45g, and 45b coupled to the other switch contacts a, a, a of the switch 43.

The control system of the display apparatus 25 further includes three identical switching devices 46r, 46g, and 46b, one for each of the electron guns of the cathode-ray tube 26. The devices just mentioned are coincident or synchronous detectors and individual ones thereof are coupled between the high-potential one of output terminals 21, 21 of the receiver 20 and individual ones of the cathodes 28r, 28g and 28b of the cathode-ray tube 26. The several switching devices also include input circuits individually coupled to individual ones of the output circuits of the amplifiers 42r, 42g, and 42b. Since the switching devices 46r, 46g, and 46b are identical, the following detailed description of one thereof will suffice.

The device 46r includes a pentode 49r having a suppressor electrode coupled to the output terminal of the amplifier 42r and having an anode coupled through a coupling condenser 50r to the cathode 28r of the cathode-ray tube. A source of potential +B is connected to the anode of the tube 49r through a load resistor 51r. A suitable potential is supplied to the screen electrode of the tube 49r through a resistor 52r connected to the junction of resistors 53r and 54r which form a voltage divider across the source +B. The cathode of the tube 49r is connected to ground through a cathode resistor 55r and the control electrode thereof is connected through an adjustable tap on a voltage divider 56r connected across the output terminals 21, 21 of the receiver 20.

Referring now to Fig. 1a of the drawings for a complete description of the ring counter 40, that device comprises three similarly connected bistable multivibrators or flip-flop circuits 60, 62, and 64. These bistable multivibrators are of identical construction and for simplicity the circuit diagram of only one thereof is represented. The multivibrator 60 includes two tubes such as triodes 61a and 61b having interconnected cathodes and having anodes and control electrodes which are cross-connected in a conventional manner through resistors 66 and 67. The anodes of the tubes 61a and 61b are connected to a source of potential +B through respective anode-load resistors 68 and 69 while the control electrodes of the tubes are connected to ground through biasing resistors 70 and 71. A voltage divider 72 is connected across the source +B and the interconnected cathodes of the triodes are connected to a tap on the voltage divider 72. The high-potential one of the input terminals 15a, 15a is connected to the anode of the tube 61a through a conductor 90, a switching device such as a diode 79, and a coupling condenser 81. A source of bias potential +B′, having a value somewhat greater than that of the tap connected to the cathodes of the tubes 61a and 61b, is connected to the junction of the cathode of the switching device 79 and the condenser 81 for a purpose which will be explained hereinafter. An output terminal 41r is connected to the junction of the condenser 81 and the anode of the tube 61a.

The anode of the tube 61b is coupled through a conductor 94, another diode switching device 73, and a condenser 74 to the anode of a tube 63a of a multivibrator 62. Hereinafter, the two sections of multivibrators 62 and 64 and their respective tubes are represented by rectangles to simplify the illustration. The anode of the tube 61b is connected through conductors 94, 93, 92, 91, and 90 to the anodes of the tubes 63b and 65b and the high-potential one of the input terminals 15a, 15a. The cathode of the switching device 73 is connected through a resistor 75 to a point on the voltage divider 72 having a potential indicated as +B′. The anode of the tube 63a of the multivibrator 62 is connected to an output terminal 41g of the ring counter 40. The anode of the tube 63b of the multivibrator 62 is coupled to the anode of the tube 65a of the multivibrator 64 through switching device 76 and condenser 78. The bias potential from the source +B′ is applied to the cathode of the switching device 76 through a resistor 77. The junction of the anode of the tube 65a and the condenser 78 is connected to the third output terminal 41b of the ring counter 40.

The operating potentials applied to the various electrodes of the multivibrators are selected in a well-known manner so that one of the tubes of each thereof is conducting while the other tube thereof is biased to cutoff, and the tubes thus remain in their predetermined conditions until a suitable control potential is applied to the multivibrators for the purpose of reversing the order of the conductivity of the tubes so that the multivibrators then assume another stable operating condition.

*General operation of radio position locator of Fig. 1*

Considering generally now the operation of the radio position locator of Fig. 1, the timing unit 10 generates sine-wave oscillations occurring at a 1-megacycle rate and these are applied to the amplifier and wave-shaping networks of the pulse generator 11 which is effective to develop periodic pulses having a 1-microsecond duration and 2-microsecond spacing for application to the count-down circuit 12. The latter effects a 900 to 1 count-down operation in a well-known manner and applies 1-microsecond pulses having 900-microsecond spacings to the pulse transmitter 13 which develops in response to each of the applied pulses individual time-reference wave-signal pulses which are applied to the directional antenna system 14 for radiation thereby. The latter is rotated at a speed of 20 rotations per minute by the motor 17 and is effective to scan the region or space thereabouts with a directional beam. A related wave signal from one or more objects such as aircraft in the scanned space is returned to the receiver either by reflection or by means of a transmitter such as a radio beacon located on that object. The related wave signal is intercepted by the antenna system 14 and is applied to the radio receiver 20 which derives position-representative output pulses at the output terminals 21, 21 thereof. These output pulses are utilized, in a manner to be explained hereinafter, to provide a plan-position indication on the screen 27 of the cathode-ray tube 26 of objects in the region scanned by the directional beam from the antenna system 14.

Considering for the moment very briefly the operation of the display apparatus 25, during the rotation of the antenna system 14 the deflection yoke 33 of the cathode-ray tube 26 is rotated in synchronism therewith and at the same speed. Simultaneously with the application of control pulses by the count-down circuit 12 to the pulse transmitter 13, there are applied to the sweep generator 30 control pulses which are effective to develop a sawtooth wave which deflects the cathode-ray beams radially over the face of the screen 27. In the well-known manner, the yoke 33, which is driven by the motor 17, effectively causes a series of radial lines to be traced on the screen 27, and the application of a pulse from the receiver 20 to the cathodes of the cathode-ray tube 26 is effective to develop a spot on the screen 27 whose position thereon is representative of the direction and distance from the radio position locator of an object in space. It will be assumed at this time that the switch 43 is operated to connect the ganged switch blades with the contacts *b, b, b,* thereby connecting unit 40 in circuit with each of the amplifiers 42r, 42g, and 42b. The ring counter 40, in a manner to be explained in detail subsequently, develops at each output terminal thereof a series of 1-microsecond pulses having a 3-microsecond spacing, the pulses from individual ones of the terminals 41r, 41g, and 41b being so interleaved that after amplification in units 42r, 42g, and 42b they are applied as successive positive-polarity pulses to the suppressor electrodes of the pentodes 49r, 49g, and 49b, respectively. When a received signal indicative of an object or target in space is applied by the output circuit of the receiver 20 to the control electrode of one of the pentodes 49r, 49g, or 49b simultaneously with the application to the suppressor electrode thereof of a gating pulse from one of the amplifiers 42r, 42g, or 42b, under certain circumstances to be described subsequently a colored spot or one having a colored fringe will appear on the screen 27 since at least one of the cathodes of the cathode-ray tube 26 will be reduced in potential to a greater extent than the other cathodes, thus causing one of the cathode beams momentarily to excite one of its corresponding phosphor dots which emits light of a given color to a greater extent than the other dots productive of other colors are excited. An indication of that target is thus produced.

*Operation of ring counter 40 of display apparatus 25 of Fig. 1 and Fig. 1a*

Prior to considering in detail the application of particular output pulses of the receiver 20 through the units 46r, 46g, and 46b to the individual cathodes 28r, 28g, and 28b of the cathode-ray tube in response to transmitted pulses, a consideration of the operation of a ring counter such as unit 40 will be helpful. In response to the short-duration negative-polarity pulses occurring at a 1-megacycle rate which are applied by the pulse generator 11 to the input terminals 15a, 15a of the ring counter 40, it is desired that there be developed at the output terminals of the amplifiers 42r, 42g, and 42b three series of 1-microsecond output pulses having the wave forms represented in Fig. 4 by curves R, G, and B. As previously mentioned, these pulses have a 1-microsecond duration and a 3-microsecond spacing and the times of occurrence of the pulses of the series are staggered in the manner represented in the last-mentioned curves. The manner in which these pulses are developed will now be considered.

Referring first to Fig. 1a, periodic negative-polarity pulses applied to the input terminals 15a, 15a are simultaneously applied to the anode of each of the switching devices 79, 76, and 73. At this time, it will be assumed that the applied potentials are such that the tubes 61a, 63b, and 65b of the bistable multivibrators 60, 62, and 64 are conductive and that the tubes 61b, 63a, and 65a are biased to cutoff. This initial operating condition may best be visualized by reference to the representation of Fig. 2a, wherein the multivibrators are shown as rectangles with the conducting tubes thereof as cross-hatched rectangles, and the switching devices 79, 76, and 73 being shown as open or closed switch blades as the case may be. Since the tube 61b is then in a nonconductive state, its anode (see also Fig. 1a) is at a high operating potential which is nearly that of the source +B and is greater than that of the potential +B' applied to the cathode of the switching device 73. Accordingly, the switching device 73 is then closed. The tubes 63b and 65b (see Fig. 2a) are conductive so that their anodes are at a lower potential than that of the anode of the tube 61b because of the heavy flow of space current through their respective anode resistors, and the anodes of the switching devices 76 and 79 (see also Fig. 1a) then have a potential less than that of their cathodes which at that time are at the potential +B'. Accordingly, the switching devices 76 and 79 are nonconductive or open at the time interval under consideration. This interval presently under consideration comprises the period $t_0$–$t_1$ represented in Fig. 3, wherein curve A thereof represents the negative-polarity pulses applied to the terminals 15a, 15a of the ring counter 40, curve B the output signal developed at the anode of the tube 61a and hence at the output terminal 41r, curve C that developed at the anode of the tube 63a and the terminal 41g, and curve D the signal developed at the anode of the tube 65a and the output terminal 41b.

At time $t_1$ another negative-polarity pulse is applied to the input terminals 15a, 15a of the ring counter of Fig. 1a (the high-potential one of these terminals being designated 15a in Figs. 2a–2c, inclusive), and is also applied through the conductors 91, 93, and 94 and the resistor 66 of Fig. 1a to the control electrode of the tube 61a of the multivibrator 60. In a similar manner, the same pulse is applied at time $t_1$ to the control electrodes of the tubes 63a and 65a of the other two multivibrators. Since the tube 65a is nonconductive at time $t_1$, the negative pulse then applied to its control electrode does not alter its operating condition and the potential of the anode of that tube and hence the potential of the terminal 41b remains at time $t_1$ as shown by curve D of Fig. 3. However, the application of a negative pulse at time $t_1$ to the control electrode of the then conductive tube 61a renders it nonconductive and the anode potential of that tube and hence that of the terminal 41r increases at time $t_1$ in a manner represented by curve B of Fig. 3. While the negative control pulse applied at time $t_1$ to the control electrode of tube 63b does not then render it conductive, the negative-going pulse then developed at the anode of the tube 61b as a result of its becoming conductive is applied through the closed switching device 73 to the control electrode of the tube 63b, and this pulse is effective to render the latter nonconductive. This produces at time $t_1$ at the anode of the tube 63a the negative-going output pulse represented by curve C.

During interval $t_1$–$t_2$, the operating condition of the ring counter 40 of Fig. 1a is as represented in Fig. 2b. At time $t_2$ the negative-polarity pulse applied to the input terminals 15a, 15a of the ring counter 40 and to the control electrode of the tube 61a thereof does not alter the operating condition of that tube since it is then not conducting. The anode potential at time $t_2$ remains as represented by curve B of Fig. 3. The negative control pulse acting upon the control electrode of the then conducting tube 63a is, however, effective to render that tube nonconductive, and the anode potential of the tube 63a then becomes more positive as represented by curve C of Fig. 3. Since the switching device 76 is closed at time $t_2$, the negative-going pulse developed at the anode of the tube 63b is translated by the device 76 and is applied to the control electrode of the tube 65b, thus rendering that tube nonconductive as shown in Fig. 2c. Tube 65a becomes conductive at time $t_2$ and its anode becomes less positive at time $t_2$ as represented by curve D of Fig. 3.

In a manner similar to that just explained, succeeding control pulses cause the various tubes and switching devices of the ring counter 40 to assume the operating conditions represented in Figs. 2c and 2a and develop at the output terminals 41r, 41g, and 41b succeeding portions of the output signals as represented by curves B, C, and D of Fig. 3 during the intervals $t_2$–$t_3$ and $t_3$–$t_4$, etc. The three series of pulses of curves B, C, and D of Fig. 3 are translated by the switch 43 and are applied to the amplifiers 42r, 42g, and 42b which amplify and reverse the polarity of the output pulses of the ring counter 40 and develop the three series of output pulses of curves R, G, and B of Fig. 4.

The operation of the ring counter 44 is similar to that explained above in connection with the ring counter 40, differing only in that the repetition rate thereof is 1/900 of that of the counter 40, and the durations and the spacings of the output pulses are about 900 times as great. Thus, with the switch 43 operated to connect the switch blades to the points a, a, a there are developed in each of the output circuits of the amplifiers 42r, 42g, and 42b output pulses having 900-microsecond durations, 2700-microsecond spacings between successive ones of a series of pulses, and a frequency of 0.370 kilocycle.

Operation of display apparatus 25 of Fig. 1

Considering now as a whole the operation of the control apparatus 25 of the radio position locator of Fig. 1, it will initially be assumed that the switch 43 is in the position represented and that the transmitter 13 develops periodic wave-signal pulses for radiation by the antenna system 14. Curve X of Fig. 4 represents the several 1-microsecond periodic time-reference wave-signal pulses T radiated at times $t_0$ and $t_0'$ by the antenna system 14. Curve X also illustrates several wave-signal pulses S intercepted by the antenna system in response to the transmitted pulses and constituting echoes received from a stationary object in the scanned region, and that curve also illustrates similar pulses M and M' received from a moving object in that region. The spacing between successive transmitted wave-signal pulses is of the order of 900 microseconds which corresponds at least to the round-trip propagation time between the radio position locator and the remotest object in the scanned space within the operating region of the locator. Simultaneously, with the application at time $t_0$ of a periodic triggering signal (not shown) to the transmitter 13 by the countdown circuit 12, the latter also applies a triggering signal to the sweep generator 30 to initiate a sweep voltage wave having the wave form represented by curve Y of Fig. 4. This sweep voltage deflects the cathode-ray beams of the tube 26 radially across the face of the screen 27 of the tube in the manner represented by the full-line radius in Fig. 5a. Because of the rotation of the yoke of the cathode-ray tube 26 by the gearing system associated with the motor 17, successive later sweeps appear as represented by the broken lines, their angular relation, however, being greatly exaggerated in the drawing to facilitate illustration. During interval $t_0$–$t_1$, the 1-microsecond positive-polarity gating pulse represented in curve R of Fig. 4 is applied to the suppressor electrode of the tube 49r of the switching device 46r, followed in succession by similar pulses of curves G and B which are applied to the suppressor electrodes of the tubes 49g and 49r during intervals $t_1$–$t_2$ and $t_2$–$t_3$, respectively, to condition individual ones of the tubes to translate the position-representative pulses applied to the control electrodes thereof from the output terminals of the receiver 20 through the adjustable taps on the resistors 56r, 56g, and 56b. The gating or conditioning operation just described is repeated in the successive intervals beginning at times $t_3$, $t_4$, $t_5$, etc., and these gating pulses are effective to condition the devices 46r, 46g, and 46b to translate position-representative or target pulses during different intervals occurring during the interval $t_0$–$t_n$.

In the absence of a target representing a fixed structure such as a tower, or in the absence of a moving object such as an aircraft, it is known that many small signals or echoes, often referred to as ground or sea clutter, are received from the scanned region. These signals are of random phase and amplitude, and the possibility that all of these signals will add in the same phase, or that the phases and amplitudes will be such that complete cancellation thereof results, is extremely remote. Thus, the clutter is of some average power level and there is the probability that the level will not change by more than a small percentage per interval of time ordinarily established by the band width of the receiver. It is also known that the probability that the clutter has a pulse width as short as that of an echo from a target is extremely remote. Accordingly, display apparatus of a conventional radio position locator which is capable of providing a display of a target only in monochrome does not permit the operator of the locator to detect small targets in the presence of clutter which is usually sufficient to mask or obscure the indications of such targets.

Assuming that the size of the spot which each of the cathode-ray beams of the display apparatus of the present invention develops on the screen 27 of the cathode-ray tube 26 is relatively large compared to the distance traversed by the spot during the radial motion thereof in the 1-microsecond commutation or switching interval established by the ring counter 40, in the absence of an object or target in the scanned region the trace developed by the cathode-ray beams on the screen 27 will be white or approach white. This is because the intensities of the three beams are such that three colored spots are produced which combine optically to produce a composite spot of white light. Such a spot is represented diagrammatically and hence not to scale in Fig. 5a by the small spot which encircles the dots r, g, and b that designate red, green, and blue fluorescing phosphor dots on the screen 27. Assuming now that there is received from a relatively small target in the region scanned in response to a transmitted pulse (such as the pulse occurring at time $t_0$–$t_1$ in curve X of Fig. 4) a pulse S which occurs during the interval $t_7$–$t_8$. After detection of the radio-frequency pulse S in the receiver 20 of Fig. 1, the derived position-representative pulse is applied to the control electrodes of the tubes 49r, 49g, and 49b. Referring to curve G of Fig. 4, it will be seen that a gating pulse occurring during the interval $t_7$–$t_8$ is present for application to the suppressor electrode of the tube 49g to render that tube momentarily conductive coincident with the application of the position-representative pulse to the control electrode of that tube. This in turn causes a negative-going pulse to be applied to the cathode 28g of the cathode-ray tube 26 to intensify the electron beam produced by the electron gun associated with that cathode. Accordingly, the green fluorescing phosphor dot identified in Fig. 5a receives a greater excitation than that afforded the adjacent red and blue phosphor dots. Thus, the color of the spot produced on the screen 27 of the cathode-ray tube in response to an echo from a stationary target will have a predominance of green, which color will serve to identify a small target that otherwise would be masked by clutter in the display of a display apparatus which produces an image only in monochrome. Although not illustrated, in the presentation of Fig. 5a, it will be clear to one skilled in the art that if another stationary object exists at a different angular relation with respect to the radio position locator, a similar indication in color will be produced on the screen 27 of the cathode-ray tube, which color, however, might have predominant blue or red components depending upon the coincidence of the particular ones of the pulses from the signals B and R of Fig. 4 which are applied to one of the suppressor electrodes of the tubes 46b and 46r in coincidence with the application of a received position-representative pulse applied by the receiver to the control electrode of that tube.

Assume now that the object or target which is being scanned by the antenna system 14 of the radio position locator is moving radially of that locator and that an echo received therefrom during the first rotation of the antenna system and the cathode-ray tube 26 is represented by the wave-signal pulse M of curve X of Fig. 4. The pulse M may occur at time $t_{51}$–$t_{52}$ and, after 360° of rotation of the radial sweep from its initial position represented by the full-line radius of Fig. 5a, the second pulse received from the same target in response to a transmitted pulse may occur at an instant earlier in the second sweep of the sweep generator of the display apparatus, that is it may occur at a time $t_{50}'$–$t_{51}'$ as represented at the right-hand portion of curve Y. Although they are not illustrated in the curves of Fig. 4, succeeding echoes from the same target occur during progressively earlier intervals in their respective sweeps when that target is moving radially toward the radio position locator. Referring to curves R and X of Fig. 4 and also to Fig. 1 of the drawings, it will be seen that at time $t_{51}$–$t_{52}$ a gating pulse from the amplifier 42r is applied to the suppressor electrode of the tube 49r simultaneously with the application of the control electrode of that tube of a position-representative pulse derived from the received wave-signal pulse M. Accordingly, a negative pulse is applied at that instant to the cathode 28r of the cathode-ray tube 26 and the intensity of the electron beam emanating from that cathode is increased so as momentarily to excite on its radial sweeps a red fluorescing phosphor dot so that the spot on the screen 27 assumes a reddish color or has a reddish colored fringe. After 360° of rotation of the antenna system 14 and the yoke of cathode-ray tube 26, and hence during the sweep of the cathode-ray beams as represented by the full-line radius of Fig. 5a, the pulse M' at the right-hand portion of curve X is applied to the control electrode of the tube 49g simultaneously with the application of a gating pulse of curve G of Fig. 4 to the suppressor electrode of that tube, thereby causing the cathode-ray gun associated with the cathode 28g of the cathode-ray tube 26 momentarily to increase the excitation of a phosphor dot which fluoresces green. As the target moves radially toward the radio position locator, on successive corresponding display sweeps the red, blue, and green fluorescing phosphor dots are successively excited so that the image of the target appears in changing colors.

This changing pattern of colors is useful in distinguishing between a moving target and a stationary one. Not only is the changing pattern of colors useful in providing a moving target indication, but it also permits an estimation by the radio locator operator of the radial component of velocity of the target. Knowing the distance between the phosphor dots of the same color on the screen of the cathode-ray tube 26, when an indication of the moving target appears on that screen the operator may time the reappearance of a particular color in the displayed image over a given or measured distance on the screen and this time interval can be employed to estimate the velocity of that target. In a manner similar to that described above, the connection between the radial sweep represented by the full-line radius of Fig. 5a, other radial sweeps which are angularly disposed with reference to the one just mentioned may be utilized to display the images of other stationary or moving targets which have an azimuth difference from that of the targets producing the pulses S', M, and M' of curve X of Fig. 4.

It may sometimes be necessary to provide on the screen of the cathode-ray tube 26 of the display apparatus of the radio position indicator an indication of a target which is moving in a circle about a center which constitutes the position of the locator. In order to produce this indication, the switch 43 is operated so that the switch blades are in engagement with the switch points $a$, $a$, $a$ as represented in Fig. 1. This is effective to connect the ring counter 44 in circuit between the counter-down circuit 12 and the ampliers 42r, 42g, and 42b while disconnecting the ring counter 40 from those amplifiers. Periodic gating pulses similar to the pulses R, G, and B of Fig. 4 are developed in the output circuit of the amplifiers just mentioned but these pulses have a duration of substantially 900 microseconds, a spacing between leading edges of substantially 2700 microseconds, and a 0.370-kilocycle repetition rate. A few of such pulses are represented by curves R', G', and B' of Fig. 6. Curve Y' of Fig. 6 represents the saw-tooth wave developed by the sweep-signal generator 30 of Fig. 1.

Fig. 5b represents the type of display produced on the screen 27 of the cathode-ray tube 26 in response to position-representative pulses derived by the receiver 20 from a moving target which is scanned by pulses radiated from the antenna system 14. During the interval $t_0-t_n$ represented in Fig. 6, the gating signal R' is applied to the suppressor electrode of the tube 49r. Gating signals are not then applied to the other tubes 49g and 49b so that during the interval $t_0-t_n$, which corresponds to the radial sweep designated by the full-line $r$ of Fig. 5b, only a radial series of red fluorescing phosphor dots may be excited by one of the cathode-ray beams from the electron guns of the tube 26. Specifically, only the electron gun associated with the cathode 28r is conditioned to permit it to develop an electron beam during the interval $t_0-t_n$ and, because of the angular approach of the cathode-ray beam thereof and the geometry of the apertured mask 29, only red fluorescing phosphor dots along a radial line may be excited. When a detected pulse signal M" derived from the echo of a moving target appears at time $t_m$ during the interval $t_0-t_n$ and is applied by the output circuit of the receiver 20 to the control electrodes of the tubes 49r, 49g, and 49b, that pulse is effective with the pulse R' to condition only the tube 49r to translate a position-representative pulse to one of the cathodes of the tube 26, namely to the cathode 28r. This pulse is effective momentarily to render conductive at time $t_m$ the electron beam from the cathode 28r, thereby producing a dot of red light on the screen 27. During the succeeding sweep interval $t_0'-t_n'$, a gating pulse is applied only to the suppressor electrode of the tube 49g and this pulse is represented by the pulse G' of Fig. 6. A position-representative pulse M" derived at the output terminals of the receiver at time $t_m'$ is momentarily effective in conjunction with the pulse G' to render the tube 49g conductive and turn on the electron gun associated with the cathode 28g, which gun is effective to excite only a phosphor dot productive of green light on the screen 27. Such a dot is represented on the radially disposed broken line $g$ which designates the path scanned by the electron beam emanating from the cathode 28g. Similarly during the next sweep $t_0''-t_n''$, the position-representative pulse M" at time $t_m''$ is effective to turn on the electron beam associated with the cathode 28b and develop a spot of blue light as represented on the radially disposed dot-dash line $b$ of Fig. 5b. Thus, it will be seen that a moving target produces on the screen 27 in changing colors an image representative of a moving body in the region scanned by the radio position locator. For a circumferentially moving target producing the indication of Fig. 5b, it is ordinarily desirable that the electron beams of the cathode-ray tube produce relatively small spots on the screen 27 of the tube so that the color dots resulting from signals from the moving target are fairly sharply defined. It will be clear that the display apparatus, with the switch 43 connected to the points $a$, $a$, $a$, will provide an indication in a single color of a fixed target in the region scanned by the radio position locator. This color will depend on the radial portion of the screen 27 of the cathode-ray tube which is being scanned at the moment the position-representative pulse is received from the scanned target.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, a source of electrons for exciting the same, and means for deflecting said electrons from said source over said screen in synchronism with said beam; and a control system responsive to said position-representative pulses and predetermined ones of said timing pulses for selectively controlling said electrons from said source, whereby said electrons are effective to scan said patterns in sequence to produce on said screen in changing colors images representative of a moving body in said region and in at least one of said colors an image representative of a stationary object in said region.

2. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor multiple electron gun cathode-ray tube including a screen having a plurality of interspersed elemental area patterns individually effective to produce individual ones of several different colors, one color for each of said electron guns, a plurality of cathode-ray sources for exciting the same, and means for deflecting cathode rays from said sources over said screen in synchronism with said beam; and a control system responsive to said position-representative pulses and predetermined ones of said timing pulses for selectively controlling the intensity of said cathode rays from said sources, whereby said cathode rays are effective to scan said patterns in sequence to produce on said screen in changing colors images representative of a moving body in said region and in at least one of said colors an image representative of a stationary object in said region.

3. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, $n$ cathode-ray guns for exciting the same with $n$ cathode-ray beams, and means for deflecting said cathode-ray beams over said screen in synchronism with said directional beam, $n$ being an integer; and a control system responsive to said position-representative pulses and predetermined ones of said timing pulses for selectively controlling said cathode-ray beams, whereby said beams are effective to scan said patterns in sequence to produce on said screen in changing colors images representative of a moving body in said region and in at least one of said colors an image representative of a stationary object in said region.

4. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, $n$ cathode-ray guns for exciting the same with $n$ cathode-ray beams, and means for deflecting said cathode-ray beams over said screen in synchronism with said directional beam, $n$ being an integer; and a control system responsive to said position-representative pulses and including $n$ switching devices individually coupled to said guns and individually responsive to $1/n$ of said timing pulses for selectively controlling said cathode-ray beams, whereby said beams are effective to scan said patterns in sequence to produce on said screen in changing colors images representative of a moving body in said region and in at least one of said colors an image representative of a stationary object in said region.

5. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, $n$ cathode-ray guns for exciting the same with $n$ cathode-ray beams, and means for deflecting said cathode-ray beams over said screen in synchronism with said directional beam, $n$ being an integer; and a control system including $n$ switching devices individually coupled to said guns and individually responsive to said position-representative pulses and $1/n$ of said timing pulses for selectively controlling said cathode-ray beams, whereby said beams are effective to scan said patterns in sequence to produce on said screen in changing colors images representative of a moving body in said region and in at least one of said colors an image representative of a stationary object in said region.

6. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a tricolor cathode-ray tube including a screen having a plurality of interspersed elemental area patterns individually effective to produce individual ones of the three colors, a source of electrons for exciting the same, and means for deflecting said electrons from said source over said screen in synchronism with said beam; and a control system responsive to said position-representative pulses and predetermined ones of said timing pulses for selectively controlling said electrons from said source, whereby said electrons are effective to scan said patterns in sequence to produce on said screen in changing colors images representative of a moving body in said region and in at least one of said colors an image representative of a stationary object in said region.

7. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a tricolor cathode-ray tube including a screen having a plurality of interspersed elemental area patterns individually effective to produce individual ones of the three colors, three cathode-ray guns for exciting the same with three cathode-ray beams, and means for deflecting said cathode-ray beams over said screen in synchronism with said directional beam; and a control system responsive to said position-representative pulses and predetermined ones of said timing pulses for selectively controlling said cathode-ray beams, whereby said beams are effective to scan said patterns in sequence to produce on said screen in changing colors images representative of a moving body in said region and in at least one of said colors an image representative of a stationary object in said region.

8. In a radio position locator including scanning means having a generator of timing pulses for angularly scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, a source of electrons for exciting the same, and means for deflecting said electrons from said source radially over said screen a distance representative of the maximum effective scanning range of the scanning means of the locator, and means for angularly displacing said radial deflections in synchronism with said beam; and a control system responsive to said position-representative pulses and predetermined ones of said timing pulses for selectively controlling said electrons from said source, whereby said electrons are effective to scan said patterns in a sequence to produce on said screen in changing colors images representative of the direction and the distance of a moving body in said region and in at least one of said colors an image representative of the direction and distance of a stationary object in said region.

9. In a radio position locator including scanning means having a generator of timing pulses for angularly scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, a source of electrons for exciting the same, and means for deflecting said electrons from said source radially over said screen a distance representative of the maximum effective scanning range of the scanning means of the locator, and means for moving said deflecting means in synchronism with said beam; and a control system responsive to said position-representative pulses and predetermined ones of said timing pulses for selectively controlling said electrons from said source, whereby said electrons are effective to scan said patterns in a sequence to produce on said screen in changing colors images representative of the direction and distance of a moving body in said region and in at least one of said colors an image representative of the direction and distance of a stationary object in said region.

10. In a radio position locator including scanning means having a generator of timing pulses for continuously scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, a source of electrons for exciting the same, and means for deflecting said electrons from said source radially over said screen a distance representative of the maximum effective scanning range of the scanning means of the locator, and means for rotating said deflecting means in synchronism with said beam; and a control system responsive to said position-representative pulses and predetermined ones of said timing pulses for selectively controlling said electrons, from said source, whereby said electrons are effective to scan said patterns in a sequence to produce on said screen in changing colors images representative of the direction and distance of a moving body in said region and in at least one of said colors an image representative of the direction and distance of a stationary object in said region.

11. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area pattern for producing different colors, $n$ cathode-ray guns for exciting the same with $n$ cathode-ray beams, and means for deflecting said cathode-ray beams over said screen in synchronism with said directional beam, $n$ being an integer; and a control system, including $n$ switching devices individually coupled to said guns and individually responsive to said position-representative pulses and including a gating device having $n$ output circuits individually coupled to individual ones of said switching devices and responsive to $1/n$ of said timing pulses, for selectively controlling said cathode-ray beams whereby said beams are effective to scan said patterns in sequence to produce on said screen in changing colors images representative of a moving body in said region and in at least one of said colors an image representative of a stationary object in said region.

12. In a radio position locator including scanning means having a generator of timing pulses for scanning a region with a directional beam of periodic time-reference wave-signal pulses and including means for receiving wave-signal pulses from an object in said region in response to said time-reference pulses and for deriving position-representative pulses therefrom, a display apparatus comprising: a multicolor cathode-ray tube including a screen having a plurality of interspersed elemental area patterns for producing different colors, $n$ cathode-ray guns for exciting the same with cathode-ray beams, and means for deflecting said cathode-ray beams over said screen in synchronism with said directional beam, $n$ being an integer; a ring counter having an input circuit responsive to said timing pulses and having $n$ output circuits for developing in each thereof $1/n$ control pulses each having a duration substantially that of the spacing between successive periodic time-reference wave-signal pulses; and a control system responsive to said position-representative pulses and including said ring counter for selectively controlling said cathode-ray beams whereby said beams are effective to scan said patterns in sequence to produce on said screen in changing colors images representative of a moving body in said region and in at least one of said colors an image representative of a stationary object in said region.

References Cited in the file of this patent

UNITED STATES PATENTS

| | | |
|---|---|---|
| 2,480,848 | Geer | Sept. 6, 1949 |
| 2,530,828 | Leverenz | Nov. 21, 1950 |
| 2,597,636 | Hall et al. | May 20, 1952 |